United States Patent
Wu et al.

(10) Patent No.: US 10,003,866 B2
(45) Date of Patent: *Jun. 19, 2018

(54) METHOD AND APPARATUS FOR TRANSMITTING AND RECEIVING CLIENT SIGNAL

(71) Applicant: Huawei Technologies Co., Ltd., Shenzhen (CN)

(72) Inventors: Qiuyou Wu, Shenzhen (CN); Limin Dong, Shenzhen (CN); Wei Su, Amsterdam (NL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/208,465

(22) Filed: Jul. 12, 2016

(65) Prior Publication Data

US 2016/0323661 A1 Nov. 3, 2016

Related U.S. Application Data

(63) Continuation of application No. 14/569,015, filed on Dec. 12, 2014, now Pat. No. 9,407,372, which is a
(Continued)

(51) Int. Cl.
*H04J 14/00* (2006.01)
*H04Q 11/00* (2006.01)
(Continued)

(52) U.S. Cl.
CPC ....... *H04Q 11/0066* (2013.01); *H04B 10/032* (2013.01); *H04B 10/27* (2013.01);
(Continued)

(58) Field of Classification Search
CPC .......... H04Q 11/0066; H04Q 11/0003; H04Q 2011/0081; H04Q 2213/1301;
(Continued)

(56) References Cited

U.S. PATENT DOCUMENTS 6,671,256 B1 * 12/2003 Xiong ................. H04J 14/0227
370/230
6,724,996 B1 4/2004 Ballintine et al.
(Continued)

FOREIGN PATENT DOCUMENTS

CN 101355821 A 1/2009
CN 102439995 A 5/2012
(Continued)

OTHER PUBLICATIONS

Jinno, et al., "Distance-Adaptive Spectrum Resource Allocation in Spectrum-Sliced Elastic Optical Path Network", Topics in Optical Communications, NTT Corporation, IEEE Commuications Magazine, Aug. 2010, pp. 138-145.
(Continued)

*Primary Examiner* — M. R. Sedighian
(74) *Attorney, Agent, or Firm* — Slater Matsil, LLP (57) ABSTRACT

Embodiments of the present invention provide a method and an apparatus for transmitting and receiving a client signal, and relate to the field of communications technologies. The method includes mapping the client signal into channels of a parallel transmission frame, where the parallel transmission frame includes at least two channels; adding an overhead for the channels of the parallel transmission frame after the mapping, to form transmission channels of the parallel transmission frame, where bit rates of the transmission channels of the parallel transmission frame are fixed; and modulating the transmission channels of the parallel transmission frame onto one or more optical carriers in a same optical fiber, and transmitting the optical carrier after the modulation.

18 Claims, 6 Drawing Sheets

Related U.S. Application Data continuation of application No. PCT/CN2012/076916, filed on Jun. 14, 2012.

(51) Int. Cl.

| | |
|---|---|
| *H04B 10/27* | (2013.01) |
| *H04B 10/50* | (2013.01) |
| *H04J 3/16* | (2006.01) |
| *H04B 10/032* | (2013.01) |
| *H04L 1/00* | (2006.01) |

(52) U.S. Cl.
CPC ............ *H04B 10/50* (2013.01); *H04J 3/1652* (2013.01); *H04J 3/1658* (2013.01); *H04L 1/0042* (2013.01); *H04Q 11/00* (2013.01); *H04Q 11/0003* (2013.01); *H04J 2203/0085* (2013.01); *H04Q 2011/0081* (2013.01); *H04Q 2213/1301* (2013.01); *H04Q 2213/13168* (2013.01); *H04Q 2213/13216* (2013.01)

(58) Field of Classification Search
CPC ......... H04Q 2213/13168; H04Q 11/00; H04Q 2213/13216; H04B 10/032; H04B 10/27; H04B 10/50; H04L 1/0042; H04J 3/1658; H04J 3/1652; H04J 2203/0085
USPC .... 398/202, 203, 204, 183, 58, 66, 5, 3, 69, 398/70
See application file for complete search history.

(56) References Cited

U.S. PATENT DOCUMENTS

| | | | |
|---|---|---|---|
| 7,583,697 B2 | 9/2009 | Zou | |
| 7,944,928 B2 | 5/2011 | Zou | |
| 8,274,892 B2 | 9/2012 | Chiang et al. | |
| 8,660,425 B2* | 2/2014 | Aoki | H04B 10/516 |
| | | | 398/137 |
| 9,014,151 B2 | 4/2015 | Zou | |
| 9,407,372 B2* | 8/2016 | Wu | H04Q 11/00 |
| 2007/0195832 A1* | 8/2007 | Liu | H04J 3/1617 |
| | | | 370/539 |
| 2008/0232818 A1 | 9/2008 | Narita et al. | |
| 2010/0074624 A1* | 3/2010 | Miller | H04J 3/1652 |
| | | | 398/98 |
| 2010/0158518 A1 | 6/2010 | Shin et al. | |
| 2011/0135305 A1* | 6/2011 | Barnard | H04B 10/572 |
| | | | 398/49 |
| 2014/0177652 A1 | 6/2014 | Su et al. | |

FOREIGN PATENT DOCUMENTS

| | | |
|---|---|---|
| EP | 2323285 A1 | 5/2011 |
| RU | 2368106 C2 | 9/2009 |

OTHER PUBLICATIONS

"Series G: Transmission Systems and Media, Digital Systems and Networks; Transmission media and optical systems characteristics—Characteristic of optical systems: Spectral grids for WDM applications: DWDM frequency grid," ITU-T, Telecommunication Standardization Sector of ITU, G.694.1, Feb. 2012, 16 pages.

"Series G: Transmission Systems and Media, Digital Systems and Networks; Transmission media characteristics—Characteristics of optical components and subsystems; Spectral grids for WDM applications: CWDM wavelength grid," ITU-T, Telecommunication Standardization Sector of ITU, G.694.2, Dec. 2003, 12 pages.

"Series G: Transmission Systems and Media Digital Systems and Networks; Digital terminal equipments—General; Series Y: Global Information Infrastructure, Internet Protocol Aspects and Next-Generation Networks; Internet protocol aspects—Transport; Interfaces for the Optical Transport Network:" ITU-T, Telecommunication Standardization Sector of ITU, G.709/Y.1331, Feb. 2012, 238 pages.

Glick, M., "Design for Switched Optical Datapaths in Computer Systems," Proceedings of 2004 6th International Conference on Transparent Optical Networks, Aug. 2004, pp. 239-242.

Jinno, M., et al., "Spectrum-Efficient and Scalable Elastic Optical Path Network: Architecture, Benefits, and Enabling Technologies," Topics in Optical Communications, IEEE Communications Magazine, Nov. 2009, 8 pages.

\* cited by examiner

METHOD AND APPARATUS FOR TRANSMITTING AND RECEIVING CLIENT SIGNAL

CROSS-REFERENCE TO RELATED APPLICATIONS

This application is a continuation of U.S. patent application Ser. No. 14/569,015, filed on Dec. 12, 2014, which is a continuation of International Application No. PCT/CN2012/076916, filed on Jun. 14, 2012. The afore-mentioned patent applications are hereby incorporated by reference in their entireties.

TECHNICAL FIELD

The present invention relates to the field of communications technologies, and in particular, to a method and an apparatus for transmitting and receiving a client signal.

BACKGROUND

An OTN (optical transport network), as a core technology of a next-generation transport network, includes electrical layer and optical layer technical specifications, has rich OAM (operation, administration and maintenance) functions, a strong TCM (tandem connection monitoring) capability, and an outband FEC (forward error correction) capability, and can implement flexible scheduling and management of a large-capacity service.

An existing OTN system has four fixed line rates OTUk (optical channel transport unit, where k=1, 2, 3, 4 which correspond to rate levels of 2.5 G, 10 G, 40 G, 100 G respectively), and a service can be adapted into only the four fixed line rates OTUk. For example, at a site A, a 40 GE four-channel parallel signal needs to be aggregated with a 10 GE signal, and transmitted to a site B. In this case, an OTU4/ODU4 may be selected to perform aggregation. The 40 GE four-channel parallel signal is first converted into a serial 64B/66 B code stream, and is mapped to an LO ODU3 after being processed, and then is mapped to 31 timeslots of an HO ODU4; for the 10 GE signal, the 10 GE signal is first mapped to an ODU2e, and then is mapped to 8 timeslots of the HO ODU4; after a supervisory overhead is added to the HO ODU4, an OTU4 frame is formed. Generally, the OTU4 uses a low-cost OTL4.n (n=4, 10) multichannel parallel interface, and therefore the OTU4 needs to be further distributed to form the OTL4.n interface, and then the OTL4.n is modulated onto an optical carrier for transmission.

However, on one hand, with a great increase in upper-layer IP services, currently a beyond 100 G technology, for example, a 400 G or 1 T optical transport technology with higher spectral efficiency, is researched in the industry. In order to achieve an optimized and most efficient network configuration to improve efficiency of using optical spectrum resources, a Flex Grid technology is introduced to the optical layer to expand the spectrum from a conventional fixed 50 GHz spectral grid (ITU-T G.694) to a flexible spectral grid with a smaller granularity, where slot=12.5 GHz (a central frequency is 193.1 THz+n×slot/2, and spectral bandwidth is m×slot). In this way, a signal may occupy multiple consecutive spectral grids.

Changing a modulation format, a carrier symbol rate, and the number of multiple subcarriers implements that spectral bandwidth changes flexibly, thereby improving effective utilization of the spectrum resources and improving bandwidth usage. On the other hand, in terms of client services, with a rapid growth of data services, an increasing amount of information is encapsulated by using an Ethernet, FC (fiber channel), and ESCON (enterprise system connection) technology, and the number of rate levels is increasing. In order to flexibly support the data services, the OTN is additionally provided with ODUflex (optical channel data unit flex) to adapt data services with various bandwidth requirements. However, the line rates of the OTN still use fixed bandwidths of 2.5 G, 10 G, 40 G, and 100 G, which is not beneficial to more efficient use of transmission bandwidth. In addition, an increasing number of client signals use a multi-wavelength parallel interface, for example, a 100 GE multichannel parallel interface, to replace the conventional serial interface, so as to implement low-cost access of a high-speed service. At the present, in order to adapt a client signal of a multi-wavelength parallel interface into a parallel OTN interface, a manner of "multiplexing, distribution, and multiplexing" is still used, and therefore processing is quite complex.

As described above, in a process in which a client signal and optical layer spectral bandwidth evolve to higher-rate ones, both the client signal and the optical layer technology have a trend of flexibility and parallelization. Therefore, it is a to-be-resolved problem that how the transport network evolves to further simplify a service processing process, thereby improving bandwidth usage and reducing network complexity, so as to adapt to a variation trend of the client signal and the optical layer spectral bandwidth.

SUMMARY

To enable a transport network to adapt to a change in a client signal and optical layer spectral bandwidth, embodiments of the present invention provide a method and an apparatus for transmitting and receiving a client signal. The technical solutions are as follows:

According to one aspect, a method for transmitting a client signal is provided, where the method includes: mapping the client signal into channels of a parallel transmission frame, where the parallel transmission frame includes at least two channels; adding an overhead for the channels of the parallel transmission frame after the mapping, to form transmission channels of the parallel transmission frame, where a management overhead is added to one of the channels of the parallel transmission frame after the mapping, the management overhead is used to centrally manage the channels of the parallel transmission frame after the mapping, and bit rates of the transmission channels of the parallel transmission frame are fixed; and modulating the transmission channels of the parallel transmission frame onto one or more optical carriers in a same optical fiber, and transmitting the optical carrier after the modulation.

A rate of the parallel transmission frame depends on the number of transmission channels of the parallel transmission frame and the bit rates of the transmission channels.

When the bit rates of the transmission channels of the parallel transmission frame are equal, the number of transmission channels of the parallel transmission frame is adjusted to form a parallel transmission frame with a changeable rate.

The mapping the client signal into channels of a parallel transmission frame includes: when a rate of the client signal is greater than a transmission rate of a single channel of the parallel transmission frame, splitting the client signal to obtain multiple client signals after the splitting, and mapping the multiple client signals that are obtained after the splitting into corresponding channels of the parallel transmission frame; or when a rate of the client signal is less than a transmission rate of a single channel of the parallel transmission frame, mapping the client signal into one channel of the parallel transmission frame; or when the client signal is a multichannel parallel client signal and a rate of a single channel of the multichannel parallel client signal is less than a rate of a single channel of the parallel transmission frame, mapping each channel of the multichannel parallel client signal into a corresponding channel of the parallel transmission frame.

The overhead added for the channels of the parallel transmission frame after the mapping includes: a frame header identifier and a mapping overhead, where the frame header identifier is used to identify a start of a channel of the parallel transmission frame, and the mapping overhead is used to indicate a location, into which the client signal is mapped, in the channel.

The overhead added for the channels of the parallel transmission frame after the mapping further includes: one or more of a channel number identifier and a forward error correction FEC code, where the channel number identifier is used to distinguish each channel of the parallel transmission frame after the mapping, and the FEC code is used to provide the channels of the parallel transmission frame with a forward error correction function.

The management overhead includes: information about allocation of a corresponding channel of the parallel transmission frame to a corresponding client signal and/or information indicating a type of a client signal carried by a corresponding channel of the parallel transmission frame.

The management overhead further includes: a lane monitor overhead and/or an automatic protection switching overhead, where the lane monitor overhead is used to monitor the channels of the parallel transmission frame, and the automatic protection switching overhead is used to implement automatic switching of the channels of the parallel transmission frame in case of a fault, so as to recover transmission of the client signal.

The modulating the transmission channels of the parallel transmission frame onto one or more optical carriers in a same optical fiber includes: separately modulating each channel in the transmission channels of the parallel transmission frame onto an optical subcarrier in a corresponding number of multiple optical subcarriers in the same optical fiber; or dividing the transmission channels of the parallel transmission frame into N groups of transmission channels, where each group includes M transmission channels, and M is the number of subcarrier modulation phases, modulating each group of M transmission channels onto one optical subcarrier, and separately modulating the N groups of transmission channels onto N optical subcarriers in the same optical fiber; or multiplexing the transmission channels of the parallel transmission frame into one data stream or data streams whose number is less than the number of transmission channels, and modulating the one data stream or the data streams whose number is less than the number of transmission channels onto a single optical carrier or a corresponding number of optical carriers in the same optical fiber; or splitting each transmission channel of the parallel transmission frame into multiple data streams with a preset rate, and separately modulating the multiple data streams corresponding to each split transmission channel onto multiple subcarriers in the same optical fiber.

According to another aspect, a method for receiving a client signal is provided, where the method includes: receiving one or more optical carriers in a same optical fiber, and demodulating transmission channels of a parallel transmission frame from the optical carrier; parsing an overhead of the transmission channels of the parallel transmission frame, to obtain channels of the parallel transmission frame, where the overhead includes a frame header identifier, a mapping overhead, and a management overhead that is extracted from one transmission channel in the transmission channels of the parallel transmission frame, where the management overhead is used to centrally manage the channels of the parallel transmission frame, and bit rates of the transmission channels of the parallel transmission frame are fixed; and de-mapping the client signal from the channels of the parallel transmission frame according to the frame header identifier, the mapping overhead, and the management overhead.

According to another aspect, an apparatus for transmitting a client signal is further provided, where the apparatus includes: a mapping module, configured to map the client signal into transmission channels of a parallel transmission frame, where the parallel transmission frame includes at least two channels; an overhead adding module, configured to add an overhead for the channels of the parallel transmission frame after the mapping module performs the mapping, to form transmission channels of the parallel transmission frame, where a management overhead is added to one of the channels of the parallel transmission frame after the mapping, the management overhead is used to centrally manage the channels of the parallel transmission frame after the mapping, and bit rates of the transmission channels of the parallel transmission frame are fixed; and a modulation and transmission module, configured to modulate the transmission channels of the parallel transmission frame that are formed by the overhead adding module onto one or more optical carriers in a same optical fiber, and transmit the optical carrier after the modulation.

A rate of the parallel transmission frame depends on the number of transmission channels of the parallel transmission frame and the bit rates of the transmission channels.

The apparatus further includes: a channel adjustment module, configured to: when the bit rates of the transmission channels of the parallel transmission frame are equal, adjust the number of transmission channels of the parallel transmission frame to form a parallel transmission frame with a changeable rate.

The mapping module includes: a first mapping unit, configured to: when a rate of the client signal is greater than a transmission rate of a single channel of the parallel transmission frame, split the client signal to obtain multiple client signals after the splitting, and map the multiple client signals that are obtained after the splitting into corresponding channels of the parallel transmission frame; or a second mapping unit, configured to: when a rate of the client signal is less than a transmission rate of a single channel of the parallel transmission frame, map the client signal into one channel of the parallel transmission frame, to obtain the parallel transmission frame after the mapping; or a third mapping unit, configured to: when the client signal is a multichannel parallel client signal and a rate of a single channel of the multichannel parallel client signal is less than a rate of a single channel of the parallel transmission frame, map each channel of the multichannel parallel client signal into a corresponding channel of the parallel transmission frame.

The overhead added for the channels of the parallel transmission frame after the mapping includes: a frame header identifier overhead and a mapping overhead, where the frame header identifier is used to identify a start of a channel of the parallel transmission frame, and the mapping overhead is used to indicate a location, into which the client signal is mapped, in the channel.

The overhead added for the channels of the parallel transmission frame after the mapping further includes: one or more of a channel number identifier and a forward error correction FEC code, where the channel number identifier is used to distinguish each channel of the parallel transmission frame after the mapping, and the FEC code is used to provide the channels of the parallel transmission frame with a forward error correction function.

The management overhead includes: information about allocation of a corresponding channel of the parallel transmission frame to a corresponding client signal and/or information indicating a type of a client signal carried by a corresponding channel of the parallel transmission frame.

The management overhead further includes: a lane monitor overhead and/or an automatic protection switching overhead, where the lane monitor overhead is used to monitor the channels of the parallel transmission frame, and the automatic protection switching overhead is used to implement automatic switching of the channels of the parallel transmission frame in case of a fault, so as to recover transmission of the client signal.

The modulation and transmission module includes: a first modulation unit, configured to separately modulate each channel in the transmission channels of the parallel transmission frame onto an optical subcarrier in a corresponding number of multiple optical subcarriers in the same optical fiber; or a second modulation unit, configured to divide the transmission channels of the parallel transmission frame into N groups of transmission channels, where each group includes M transmission channels, and M is the number of subcarrier modulation phases, modulate each group of M transmission channels onto one optical subcarrier, and separately modulate the N groups of transmission channels onto N optical subcarriers in the same optical fiber; or a third modulation unit, configured to multiplex the transmission channels of the parallel transmission frame into one data stream or data streams whose number is less than the number of transmission channels, and modulate the one data stream or the data streams whose number is less than the number of transmission channels onto a single optical carrier or a corresponding number of optical carriers in the same optical fiber; or a fourth modulation unit, configured to split each transmission channel of the parallel transmission frame into multiple data streams with a preset rate, and separately modulate the multiple data streams corresponding to each split transmission channel onto multiple subcarriers in the same optical fiber.

According to another aspect, an apparatus for receiving a client signal is further provided, where the apparatus includes: a demodulation module, configured to receive one or more optical carriers in a same optical fiber, and demodulate transmission channels of a parallel transmission frame from the optical carrier; an overhead parsing module, configured to parse an overhead of the transmission channels of the parallel transmission frame that are demodulated by the demodulation module, to obtain channels of the parallel transmission frame, where the overhead includes a frame header identifier, a mapping overhead, and a management overhead that is extracted from one transmission channel in the transmission channels of the parallel transmission frame, where the management overhead is used to centrally manage the channels of the parallel transmission frame and bit rates of the transmission channels of the parallel transmission frame are fixed; and a de-mapping module, configured to de-map the client signal from the channels of the parallel transmission frame after the mapping according to the frame header identifier, the mapping overhead, and the management overhead that are parsed by the overhead parsing module.

Beneficial effects of the technical solutions provided by the embodiments of the present invention are: a structure of a parallel transmission frame is defined, a client signal, especially a multichannel parallel client signal, is mapped into transmission channels of the parallel transmission frame, and the transmission channels are modulated onto one or more optical carriers in a same optical fiber, which greatly simplifies processing complexity for adapting the multichannel parallel client signal, circumvents an existing processing process of "multiplexing, distribution, and multiplexing", simplifies a signal adaptation process, and prevents setting a large number of buffers at a receiving end to compensate for a delay among multiple transmission channels, thereby saving costs. Therefore, a transport network can adapt to a change in a client signal and optical layer spectral bandwidth.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
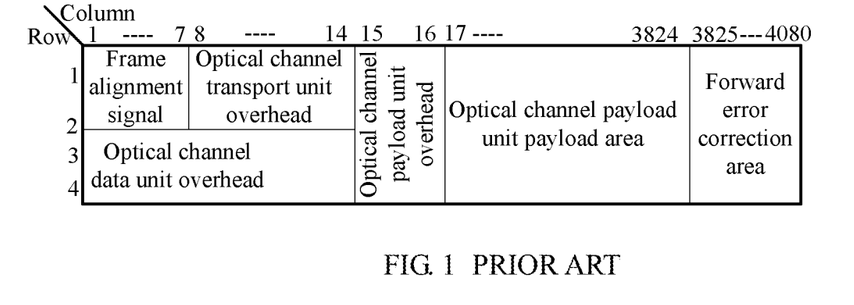
FIG. 1 is a schematic structural diagram of an OTN (optical transport network) in the prior art.

An OTN (optical transport network) frame structure is shown in FIG. 1. An OTN frame has a frame structure of 4×4080 bytes (that is, 4 rows×4080 columns). The OTN frame structure includes a framing area, an OTUk (Optical Channel Transport Unit, optical channel transport unit, where k=1, 2, 3, 4 which correspond to rate levels of 2.5 G, 10 G, 40 G, 100 G respectively) OH (overhead area), an ODUk (optical channel data unit, where k=1, 2, 3, 4 which correspond to the rate levels of 2.5 G, 10 G, 40 G, 100 G respectively, or k=flex which indicates an any bit rate) OH, an OPUk (optical channel payload unit, where k=1, 2, 3, 4 which correspond to the rate levels of 2.5 G, 10 G, 40 G, 100 G respectively, and k=flex which indicates an any bit rate) OH, a payload area, an FEC (forward error correction) area, and the like. The framing area includes an FAS (frame alignment signal), where the OPUk OH is mainly used for client service mapping and adaptation management, ODUk OH information is mainly used for managing and monitoring the OTN frame, and OTUk OH information is mainly used for monitoring a transmission section. In addition, the FEC area is reserved.

Figure 2:
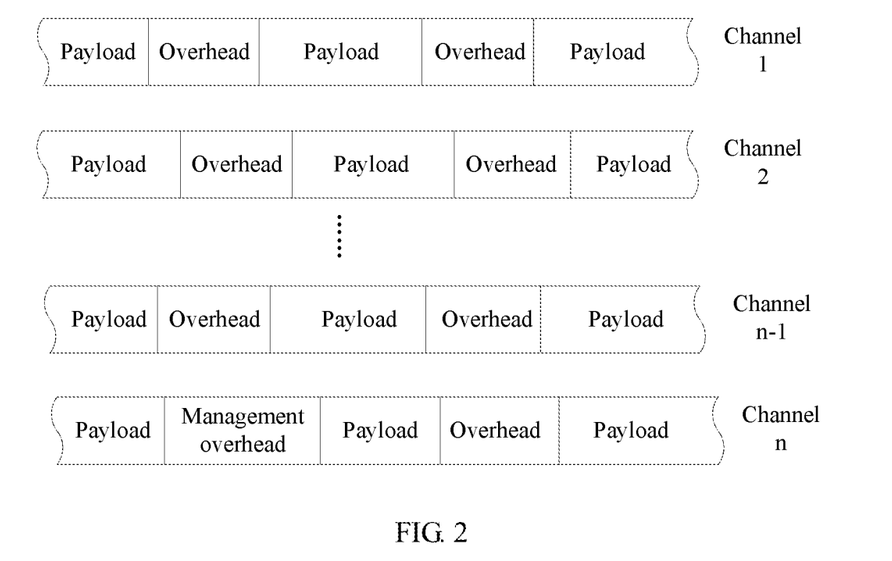
FIG. 2 is a schematic diagram of transmission channels of a parallel transmission frame according to an embodiment.

To enable a transport network to adapt to a change in a client signal and optical layer spectral bandwidth, an embodiment provides a parallel transmission frame. As shown in FIG. 2, the parallel transmission frame includes n parallel transmission channels, where n is greater than or equal to 2, each transmission channel has a frame structure defined by a frame header, and bit rates of the transmission channels of the parallel transmission frame are fixed. The parallel transmission frame includes an overhead area and a payload area. The payload area is used to carry a client signal, and the overhead area is used to carry overhead information of the transmission channels. An overhead area of each transmission channel includes a frame header identifier, which is used to define a start of the channel of the parallel transmission frame. Optionally, the overhead area of each transmission channel may further include a channel number identifier (ID), which is used to distinguish each channel. It should be noted that, one of the transmission channels of the parallel transmission frame further includes a management overhead, which is used to centrally manage the channels of the parallel transmission frame. Which transmission channel the management overhead is specifically set on is not specifically limited in this embodiment.

In this embodiment, the management overhead includes: information about allocation of a corresponding channel of the parallel transmission frame to a corresponding client signal, which is similar to an OTN payload structure identifier (PSI) and is used to indicate a client signal carrying status of the corresponding channel of the parallel transmission frame; and information indicating a type of the client signal carried by the corresponding channel of the parallel transmission frame, which is similar to an OTN payload type (PT) identifier and is used to indicate the type of the client signal carried by the corresponding channel of the parallel transmission frame. Optionally, the management overhead may further include: a lane monitor (LM) overhead and/or automatic protection switching (APS) overhead, where the lane monitor overhead is used to monitor the channels of the parallel transmission frame, and the automatic protection switching overhead is used to implement automatic channel switching in case of a fault to recover transmission of the client signal.

From a perspective of a management plane or a control plane, these management overheads can enable the physically independent channels of the parallel transmission frame to be treated as a unified whole for management; on a switching plane, multiple physically independent channels of the parallel transmission frame may still be treated as a unified whole for cross-connection grooming. In a receiving direction of an intermediate node, a central management overhead is set only on one of the transmission channels, so that it is not required to parse all the transmission channels of the parallel transmission frame on the intermediate node, and only the one transmission channel that carries the management overhead needs to be parsed, which greatly simplifies overhead processing complexity of the intermediate node.

Figure 3:
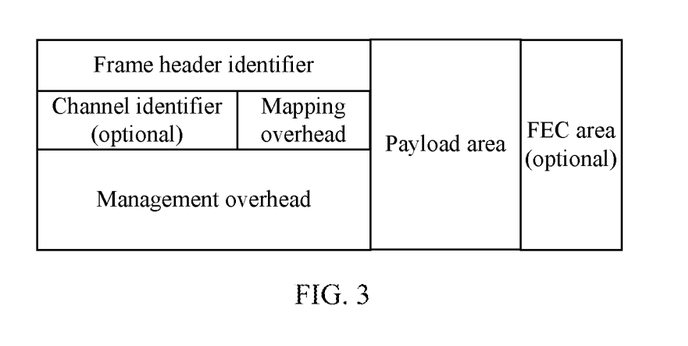
FIG. 3 is a schematic diagram of a frame structure of one of transmission channels that is of a parallel transmission frame and has a management overhead according to an embodiment.

In this embodiment, each transmission channel of the parallel transmission frame may use a frame structure similar to that of an OTN, a frame structure similar to that of a GFP (Generic Framing Procedure), or a frame structure similar to that of an Ethernet, which is not specifically limited in this embodiment. In this embodiment, description is provided by using an example in which each transmission channel of the parallel transmission frame uses a frame structure similar to a TDM (time division multiplexing) frame structure of an OTN. On a transmission channel of the parallel transmission frame, a part of an overhead area is set as a management overhead based on an existing OTN frame structure, and no management overhead needs to be set on the other transmission channels of the parallel transmission frame. As shown in FIG. 3, FIG. 3 is a frame structure of a channel on which a management overhead is set, which includes a frame header identifier, the management overhead, a channel identifier (optional) and a payload area, and an optional FEC area that is reserved.

It should be noted that, a possible alternative solution for setting a management overhead on a transmission channel of a parallel transmission frame is: the management overhead is set on one of the transmission channels of the parallel transmission frame, and management overheads with a same value may also be set on the other transmission channels or some of the other transmission channels of the parallel transmission frame. However, any management overhead provides a function of centrally managing the transmission channels of the parallel transmission frame. A purpose of setting multiple management overheads with the same value is to improve transmission reliability. For example, a multi-decision manner is used, and if multiple same management overheads are received in a receiving direction, it indicates that no error occurs when the management overheads are transmitted in a line.

It should be noted that, another possible alternative solution for setting a management overhead on a transmission channel of a parallel transmission frame is: an entire transmission channel of the parallel transmission frame may be allocated to a management overhead to use; in this case, the transmission channel of the parallel transmission frame may also be referred to as a management channel of the parallel transmission frame. Optionally, an FEC area may also be allocated to all or some of the other transmission channels of the parallel transmission frame on the management channel, and is used to implement a centralized FEC function on the management channel.

In this embodiment, the bit rates of the transmission channels of the parallel transmission frame may be the same and may also be different. Preferably, for ease of implementation, it may be defined that rates (V) of all the transmission channels of the parallel transmission frame are equal. In addition, in order to adapt to a spectrum change at an optical layer, that is, expanding from a conventional fixed 50 GHz spectral grid (ITU-T G.694) to a flexible spectral grid with a smaller granularity, where slot=12.5 GHz (a central frequency is 193.1 THz+n×slot/2, and spectral bandwidth is m×slot). Preferably, the rates of the transmission channels of the parallel transmission frame may be selected to be around 12.5 G, 25 G, 50 G, or 100 G. Optionally, in order to be compatible with an existing OTN system, a bit rate fitting an existing OTN line rate may also be selected, so that the existing OTN line rate can be transparently mapped into a payload area of a transmission channel of the parallel transmission frame. The present invention imposes only a limitation that the rates of the transmission channels of the parallel transmission frame are fixed, but does not impose a limitation on specific rates of the transmission channels of the parallel transmission frame.

In this embodiment, a rate of the parallel transmission frame depends on the number of transmission channels of the parallel transmission frame and the bit rates of the transmission channels, where the bit rates of the transmission channels of the parallel transmission frame are fixed. A flexible and changeable rate of the parallel transmission frame may be achieved by configuring a different number of channels. When the bit rates of the transmission channels of the parallel transmission frame are equal, after the number n of transmission channels of the parallel transmission frame is determined, a total bit rate of the parallel transmission frame is n*V. When the bit rates of the transmission channels of the parallel transmission frame are different, the total bit rate of the parallel transmission frame is a sum of the bit rates of the transmission channels. Because of characteristics of being flexible and changeable of the parallel transmission frame, if the rates of the transmission channels of the parallel transmission frame are set appropriately, a super high OTN rate may be achieved easily. For example, for a 400 G/1 T OTU5, if a 10 G level is selected for a rate of a single transmission channel, a 400 G-level OTU5 may be constructed when n=40, and a 1 T-level OTU5 may be constructed when n=100; if a 100 G level is selected for a rate of a single transmission channel, a 400 G-level OTU5 may be constructed by using only four transmission channels, and a 1 T-level OTU5 may be constructed by using only 10 transmission channels.

Figure 4:
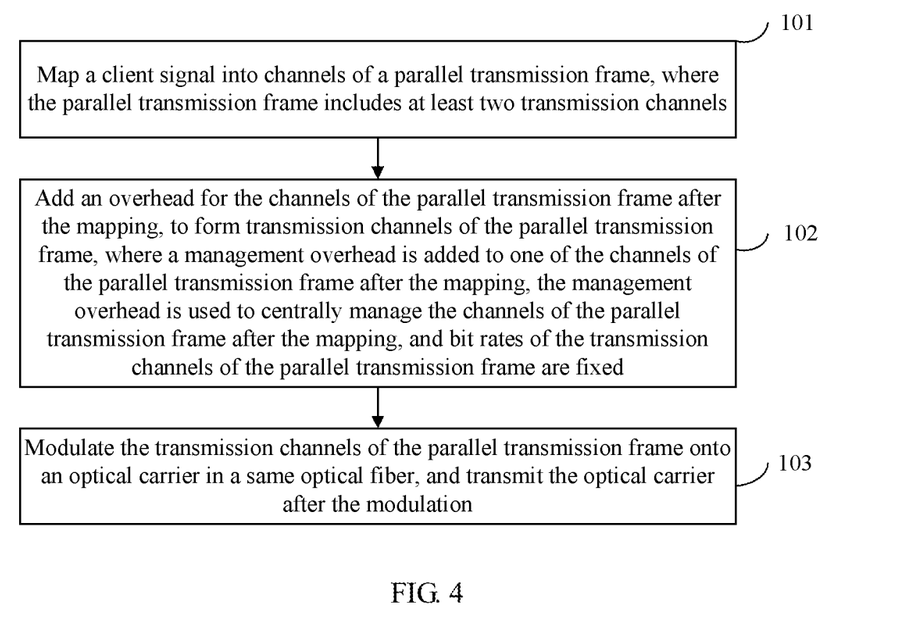
FIG. 4 is a flowchart of a method for transmitting a client signal according to an embodiment.

Based on the foregoing definition of the parallel transmission frame, the following methods for processing a client signal are provided in the embodiments:

Referring to FIG. 4, a method for transmitting a client signal is provided in an embodiment, and includes the following steps.

101: Map the client signal into channels of a parallel transmission frame, where the parallel transmission frame includes at least two channels.

102: Add an overhead for the channels of the parallel transmission frame after the mapping, to form transmission channels of the parallel transmission frame, where a management overhead is added to one of the channels of the parallel transmission frame after the mapping, the management overhead is used to centrally manage the channels of the parallel transmission frame after the mapping, and bit rates of the transmission channels of the parallel transmission frame are fixed.

103: Modulate the transmission channels of the parallel transmission frame onto one or more optical carriers in a same optical fiber, and transmit the optical carrier after the modulation.

Beneficial effects of this embodiment are: a structure of a parallel transmission frame is defined, a client signal, especially a multichannel parallel client signal, is mapped into transmissions channels of the parallel transmission frame, which greatly simplifies processing complexity for adapting the multichannel parallel client signal, circumvents an existing processing process of "multiplexing, distribution, and multiplexing", and simplifies a signal adaptation process, thereby enabling a transport network to adapt to a change in the client signal and optical layer spectral bandwidth.

Figure 5:
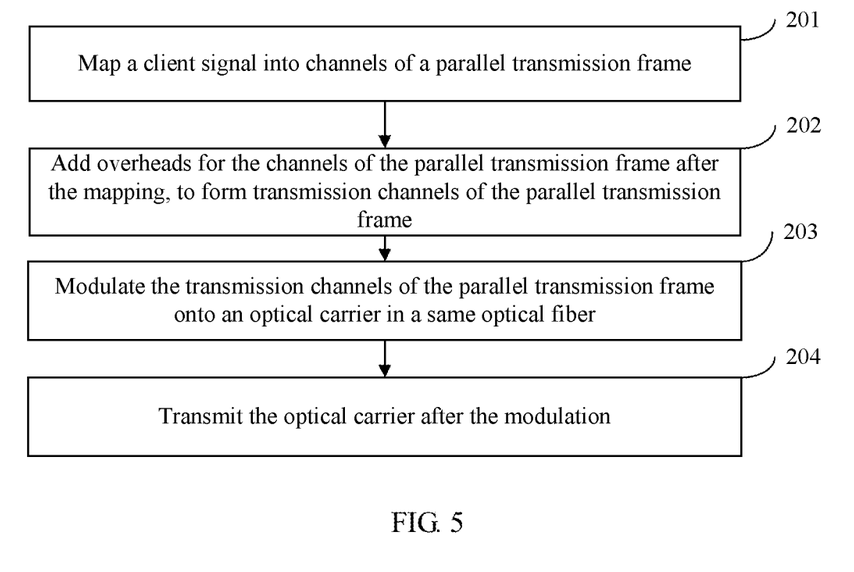
FIG. 5 is a flowchart of another method for transmitting a client signal according to an embodiment.

Referring to FIG. 5, a method for transmitting a client signal is provided in an embodiment, and includes the following steps.

201: Map the client signal into channels of a parallel transmission frame.

In this embodiment, a transport network transmits the client signal to a client. Based on the parallel transmission frame provided in this embodiment, the client signal is mapped into the channels of the parallel transmission frame first. The number of channels of the parallel transmission frame may be 2, 5, 8, 15, and the like, which is not specifically limited in this embodiment.

Further, in this embodiment, the client signal may be processed differently with respect to a feature of the client signal. Specifically, the mapping the client signal into channels of a parallel transmission frame includes: when a rate of the client signal is greater than a rate of a single channel of the parallel transmission frame, splitting the client signal to obtain multiple client signals after the splitting, and mapping the multiple client signals that are obtained after the splitting into corresponding channels of the parallel transmission frame; or when a rate of the client signal is less than a rate of a single channel of the parallel transmission frame, mapping the client signal into one channel of the parallel transmission frame; or when the client signal is a multichannel parallel signal and a rate of a single channel of the multichannel parallel client signal is less than a rate of a single channel of the parallel transmission frame, mapping each channel of the multichannel parallel client signal into a corresponding channel of the parallel transmission frame.

202: Add overheads for the channels of the parallel transmission frame after the mapping, to form transmission channels of the parallel transmission frame.

In this step, when the client signal is mapped into the channels of the parallel transmission frame, a corresponding overhead is added for each channel to an overhead area of the channel of the parallel transmission frame. Specifically, each of the overheads added for the channels of the parallel transmission frame after the mapping includes: a frame header identifier and a mapping overhead, where the frame header identifier is used to identify a start of a channel of the parallel transmission frame, and the mapping overhead is used to indicate a location, into which the client signal is mapped, in the channel.

Optionally, each of the overheads added for the channels of the parallel transmission frame after the mapping further includes: one or more of a channel number identifier and a forward error correction FEC code, where the channel number identifier is used to distinguish each channel of the parallel transmission frame after the mapping, and the FEC code is used to provide the channels of the parallel transmission frame with a forward error correction function.

In this embodiment, optionally, for the mapping overhead and the FEC, the mapping overhead and the FEC may be added to each transmission channel, and the mapping overhead and the FEC of each channel may also be centrally added to a channel. A manner of adding the mapping overhead and the FEC overhead that is used in a specific implementation process is not specifically limited in this embodiment.

In this embodiment, a management overhead is added to one of the channels of the parallel transmission frame after the mapping, where the management overhead is used to centrally manage the channels of the parallel transmission frame after the mapping. In this embodiment, specifically, the management overhead includes: information about allocation of a corresponding channel of the parallel transmission frame to a corresponding client signal and/or information indicating a type of a client signal carried by a corresponding channel of the parallel transmission frame.

Optionally, the management overhead further includes: a lane monitor overhead and/or an automatic protection switching overhead, where the lane monitor overhead is used to monitor the channels of the parallel transmission frame, and the automatic protection switching overhead is used to implement automatic switching of the channels of the parallel transmission frame in case of a fault, so as to recover transmission of the client signal.

It should be noted that, in this embodiment, the management overhead may also be added first, and then the mapping overhead is added to each channel. A specific adding sequence is not specifically limited in this embodiment.

In addition, if packet encapsulation similar to a GFP manner is applied to the parallel transmission frame, a fixed filler is included between frames, and is used to adapt a rate difference between the client signal and the channel. If a TDM frame manner is used, no additional fixed filler needs to be added between frames. Rate adjustment may be performed between the client signal and the channel in any one or more manners of a GMP (Generic Mapping Procedure) or a conventional JC (justification control) byte, an NJO (negative justification opportunity) byte, and a PJO (positive justification opportunity) byte, which is not specifically limited in this embodiment.

203: Modulate the transmission channels of the parallel transmission frame onto one or more optical carriers in a same optical fiber.

In this step, the transmission channels of the parallel transmission frame are modulated onto the optical carrier in the same optical fiber for transmission, where a single-carrier or multi-carrier transmission technology may be used. For single-carrier transmission, code streams of multiple channels of the parallel transmission frame may be separately modulated to different phases of a single carrier, for example, a QPSK (Quadrature Phase-Shift Keying) modulation format is used. For multi-carrier transmission, one or more channels of the parallel transmission frame may be modulated onto one subcarrier according to a used modulation format, and then a multi-carrier signal is generated. Further optionally, an OFDM multi-carrier transmission technology may be used, and different subcarriers may use different modulation formats, such as PSK, QPSK, 4 QAM (Quadrature Amplitude Modulation), and 16 QAM. Alternatively, each channel of the parallel transmission frame may further be divided into multiple data streams with a lower rate, and then the multiple data streams are modulated onto multiple subcarriers.

In this embodiment, specifically, the modulating the transmission channels of the parallel transmission frame onto one or more optical carriers in a same optical fiber includes: separately modulating each channel in the transmission channels of the parallel transmission frame onto an optical subcarrier in a corresponding number of multiple optical subcarriers in the same optical fiber; or dividing the transmission channels of the parallel transmission frame into N groups of transmission channels, where each group includes M transmission channels, and M is the number of subcarrier modulation phases, modulating each group of M transmission channels onto one optical subcarrier, and separately modulating the N groups of transmission channels onto N optical subcarriers in the same optical fiber; or multiplexing the transmission channels of the parallel transmission frame into one data stream or data streams whose number is less than the number of transmission channels, and modulating the one data stream or the data streams whose number is less than the number of transmission channels onto a single optical carrier or a corresponding number of optical carriers in the same optical fiber; or splitting each transmission channel of the parallel transmission frame into multiple data streams with a preset rate, and then separately modulating the multiple data streams corresponding to each transmission channel onto multiple subcarriers in the same optical fiber, where the preset rate refers to a rate that is lower than a rate of a single transmission channel of the parallel transmission frame, which is not specifically limited in this embodiment.

In this embodiment, the transmission channels of the parallel transmission frame are modulated onto the optical carrier in the same optical fiber. In the case of a single carrier, all the transmission channels of the parallel transmission frame are transmitted only in a single optical carrier, and the single carrier will be finally modulated to the same optical fiber for transmission; therefore, different independent transmission channels of the parallel transmission frame are eventually transmitted on a same optical path, a delay, on the optical path, of different transmission channels of the parallel transmission frame may be ignored, and a delay, in electrical processing, of different transmission channels of the parallel transmission frame may be controlled by using an internal circuit. In the case of multiple carriers, because this embodiment imposes a limitation that all multiple carriers corresponding to all different transmission channels of the same parallel transmission frame are eventually modulated to a same optical fiber for transmission, different independent transmission channels of the parallel transmission frame are also eventually transmitted on a same optical path in the case of the multiple carriers.

Therefore, in the case of the multiple carriers, a delay, on the optical path, of different transmission channels of the parallel transmission frame may also be ignored. In the case of the multiple carriers, a delay, in electrical processing, of different transmission channels of the parallel transmission frame is also consistent with that in the case of a single carrier, and may be controlled by using an internal circuit. Therefore, in this embodiment, among overheads of different transmission channels of the parallel transmission frame, a delay compensation overhead that is particularly used for controlling or compensating different independent transmission channels of the parallel transmission frame is excluded, and an MFI1/MFI2 (multi-frame indicator) function overhead similar to that in an OTN or SDH (Synchronous Digital Hierarchy) virtual concatenation technology is excluded.

In this embodiment, different transmission channels of the parallel transmission frame are modulated onto the optical carrier in the same optical fiber, and setting the delay compensation overhead with complex processing is prevented on the different transmission channels, so that it is prevented that a large number of buffers are set on a receiving end to compensate for a delay among multiple different transmission channels, which saves plenty of costs.

204: Transmit the optical carrier after the modulation.

In this step, after the signal transmission channels of the parallel transmission frame are modulated onto the optical carrier in the same optical fiber, the client signal is transmitted to the receiving end by using the optical carrier. It should be noted that, in this embodiment, when the optical carriers, corresponding to different transmission channels of the parallel transmission frame, in the same optical fiber are processed on an optical carrier switching node, for example, an OADM (optical add-drop multiplexer) node or a ROADM (reconfigurable optical add-drop multiplexer) node, the optical carriers, corresponding to the different transmission channels of the parallel transmission frame, in the same optical fiber must be switched as a group in a unified manner, so as to prevent that the optical carriers in the same optical fiber are switched into different optical fibers, and prevent bringing a large optical path delay between the different transmission channels.

In order to make a person skilled in the art better understand the method for transmitting a client signal provided in the present invention, the following example is used.

A frame structure of a parallel transmission frame uses an existing OTN frame structure; after a single-channel rate of the parallel transmission frame is determined, for example, a single-channel rate of a 12.5 G level is selected, the number of channels of the parallel transmission frame may be configured flexibly, thereby obtaining a series of flexible transmission line bandwidth OTUflex(n)=12.5 G*n. For example, at a site A, when a 40 GE four-channel parallel signal (40 GBASE-R) needs to be aggregated with a 10 GE signal (10 GBASE-R), it is configured that n=5, and then total bandwidth of the parallel transmission frame is about 12.5*5=62.5 G. Each signal of the 40 GE four-channel parallel signal may be separately mapped into four channels of an OTUflex(n=5) by using the GMP, and the 10 GE signal may be mapped into one channel of the OTUflex(n=5) by using the GMP. This solution achieves efficient transmission of 40 GE and 10 GE signals by configuring a flexible OTUflex, which greatly saves bandwidth and simplifies logic processing.

Beneficial effects of this embodiment are: a structure of a parallel transmission frame is defined, a client signal, especially a multichannel parallel client signal, is mapped into transmission channels of the parallel transmission frame, and the transmission channels are modulated onto one or more optical carriers in a same optical fiber, which greatly simplifies processing complexity for adapting the multichannel parallel client signal, circumvents an existing processing process of "multiplexing, distribution, and multiplexing", simplifies a signal adaptation process, and prevents setting a large number of buffers at a receiving end to compensate for a delay among multiple transmission channels, thereby saving costs. Therefore, a transport network can adapt to a change in a client signal and optical layer spectral bandwidth. A rate of the parallel transmission frame may change flexibly; therefore, a flexible transmission line interface can be conveniently implemented, so as to resolve a problem of a mismatch between service bandwidth and line bandwidth, thereby improving bandwidth usage. In addition, each channel uses a low-rate interface, which facilitates chip implementation and helps the transport network to evolve towards a super high speed.

Figure 6:
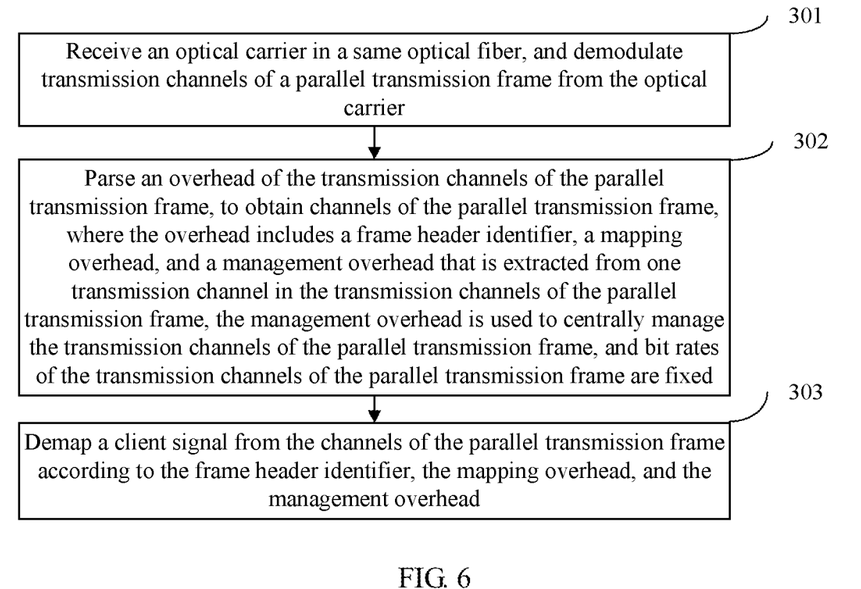
FIG. 6 is a flowchart of a method for receiving a client signal according to an embodiment.

Referring to FIG. 6, a method for receiving a client signal is provided in an embodiment, and includes the following steps.

301: Receive one or more optical carriers in a same optical fiber, and demodulate transmission channels of a parallel transmission frame from the optical carrier.

A method for performing demodulation on the optical carrier in the same optical fiber is similar to that in the prior art, and is not described in this embodiment again.

302: Parse an overhead of the transmission channels of the parallel transmission frame, to obtain channels of the parallel transmission frame, where the overhead includes a frame header identifier, a mapping overhead, and a management overhead that is extracted from one transmission channel in the transmission channels of the parallel transmission frame, where the management overhead is used to centrally manage the transmission channels of the parallel transmission frame, and bit rates of the transmission channels of the parallel transmission frame are fixed.

In this embodiment, the management overhead includes: information about allocation of a corresponding channel of the parallel transmission frame to a corresponding client signal and/or information indicating a type of a client signal carried by a corresponding channel of the parallel transmission frame.

The parsing overhead information of the transmission channels of the parallel transmission frame, to obtain channels of the parallel transmission frame includes: obtaining the frame header identifier of each transmission channel of the parallel transmission frame; and identifying a frame structure of each transmission channel according to the frame header identifier of each transmission channel of the parallel transmission frame, to obtain the channels of the parallel transmission frame.

Further, the parsing overhead information of the transmission channels of the parallel transmission frame, to obtain channels of the parallel transmission frame further includes performing forward error correction FEC code processing on each transmission channel.

303: De-map the client signal from the transmission channels of the parallel transmission frame according to the frame header identifier, the mapping overhead, and the management overhead.

The de-mapping, according to the mapping overhead, and the information about the allocation of the corresponding channel of the parallel transmission frame to the corresponding client signal and/or the information indicating the type of the client signal carried by the corresponding channel of the parallel transmission frame in the management overhead is similar to that in the prior art, and is not described in this embodiment again.

Beneficial effects of this embodiment are: one or more optical carriers in a same optical fiber are received, and transmission channels of a parallel transmission frame are demodulated from the optical carrier; an overhead of the transmission channels of the parallel transmission frame is parsed, to obtain channels of the parallel transmission frame; the client signal is de-mapped from the channels of the parallel transmission frame according to a mapping overhead and a management overhead. In this way, low-speed processing of multi-channelization is implemented when optically transmitted data with higher spectral efficiency is decoded, thereby reducing complexity and costs of processing by a receiving end.

Figure 7:
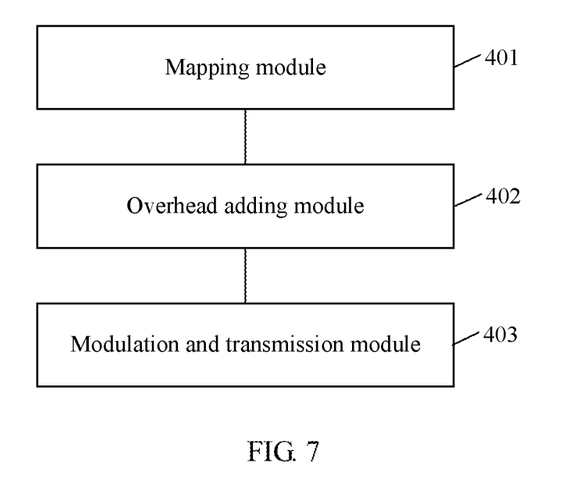
FIG. 7 is a schematic diagram of an apparatus for transmitting a client signal according to an embodiment.

Referring to FIG. 7, an apparatus for transmitting a client signal is provided in an embodiment, and includes: a mapping module 401, an overhead adding module 402, and a modulation and transmission module 403.

The mapping module 401 is configured to map the client signal into channels of a parallel transmission frame, where the parallel transmission frame includes at least two channels.

The overhead adding module 402 is configured to add an overhead for the channels of the parallel transmission frame after the mapping module 401 performs the mapping, to form signal transmission channels of the parallel transmission frame, where a management overhead is added to one of the channels of the parallel transmission frame after the mapping, the management overhead is used to centrally manage the channels of the parallel transmission frame after the mapping, and bit rates of the transmission channels of the parallel transmission frame are fixed.

The modulation and transmission module 403 is configured to modulate the transmission channels of the parallel transmission frame that are formed by the overhead adding module 402 onto one or more optical carriers in a same optical fiber, and transmit the optical carrier after the modulation.

A rate of the parallel transmission frame depends on the number of transmission channels of the parallel transmission frame and the bit rates of the transmission channels.

Optionally, the apparatus further includes a channel adjustment module, configured to: when the bit rates of the transmission channels of the parallel transmission frame are equal, adjust the number of transmission channels of the parallel transmission frame to form a parallel transmission frame with a changeable rate.

Figure 8:
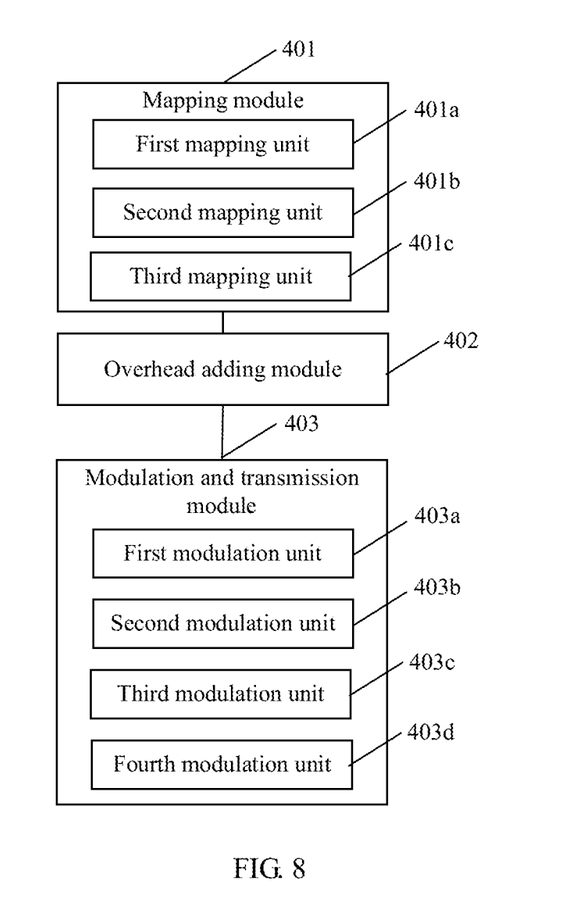
FIG. 8 is a schematic diagram of another apparatus for transmitting a client signal according to an embodiment.

Referring to FIG. 8, optionally, the mapping module 401 includes a first mapping unit 401a, configured to: when a rate of the client signal is greater than a transmission rate of a single channel of the parallel transmission frame, split the client signal to obtain multiple client signals after the splitting, and map the multiple client signals that are obtained after the splitting into corresponding channels of the parallel transmission frame; or a second mapping unit 401b, configured to: when a rate of the client signal is less than a transmission rate of a single channel of the parallel transmission frame, map the client signal into one channel of the parallel transmission frame; or a third mapping unit 401c, configured to: when the client signal is a multichannel parallel signal and a rate of a single channel of the multichannel parallel client signal is less than a rate of a single channel of the parallel transmission frame, map each channel of the multichannel parallel client signal into a corresponding channel of the parallel transmission frame.

In this embodiment, the overhead added for the channels of the parallel transmission frame after the mapping includes a frame header identifier and a mapping overhead, where the frame header identifier is used to identify a start of a channel of the parallel transmission frame, and the mapping overhead is used to indicate a location, into which the client signal is mapped, in the channel.

Optionally, the overhead added for the channels of the parallel transmission frame after the mapping further includes one or more of a channel number identifier and a forward error correction FEC code, where the channel number identifier is used to distinguish each channel of the parallel transmission frame after the mapping, and the FEC code is used to provide the channels of the parallel transmission frame with a forward error correction function.

In this embodiment, the management overhead includes information about allocation of a corresponding channel of the parallel transmission frame to a corresponding client signal and/or information indicating a type of a client signal carried by a corresponding channel of the parallel transmission frame.

Optionally, the management overhead further includes a lane monitor overhead and/or an automatic protection switching overhead, where the lane monitor overhead is used to monitor the channels of the parallel transmission frame, and the automatic protection switching overhead is used to implement automatic switching of the channels of the parallel transmission frame in case of a fault, so as to recover transmission of the client signal.

Optionally, referring to FIG. 8, the modulation and transmission module 403 includes a first modulation unit 403a, configured to separately modulate each channel in the transmission channels of the parallel transmission frame onto an optical subcarrier in a corresponding number of multiple optical subcarriers in the same optical fiber; or a second modulation unit 403b, configured to divide the transmission channels of the parallel transmission frame into N groups of transmission channels, where each group includes M transmission channels, and M is the number of subcarrier modulation phases, modulate each group of M transmission channels onto one optical subcarrier, and separately modulate the N groups of transmission channels onto N optical subcarriers in the same optical fiber; or a third modulation unit 403c, configured to multiplex the transmission channels of the parallel transmission frame into one data stream or data streams whose number is less than the number of transmission channels, and modulate the one data stream or the data streams whose number is less than the number of transmission channels onto a single optical carrier or a corresponding number of optical carriers in the same optical fiber; or a fourth modulation unit 403d, configured to split each transmission channel of the parallel transmission frame into multiple data streams with a preset rate, and separately modulate the multiple data streams corresponding to each split transmission channel onto multiple subcarriers in the same optical fiber.

Beneficial effects of this embodiment are: a structure of a parallel transmission frame is defined, a client signal, especially a multichannel parallel client signal, is mapped into transmission channels of the parallel transmission frame, and the transmission channels are modulated onto one or more optical carriers in a same optical fiber, which greatly simplifies processing complexity for adapting the multichannel parallel client signal, circumvents an existing processing process of "multiplexing, distribution, and multiplexing," simplifies a signal adaptation process, and prevents setting a large number of buffers at a receiving end to compensate for a delay among multiple transmission channels, thereby saving costs. Therefore, a transport network can adapt to a change in a client signal and optical layer spectral bandwidth.

Figure 9:
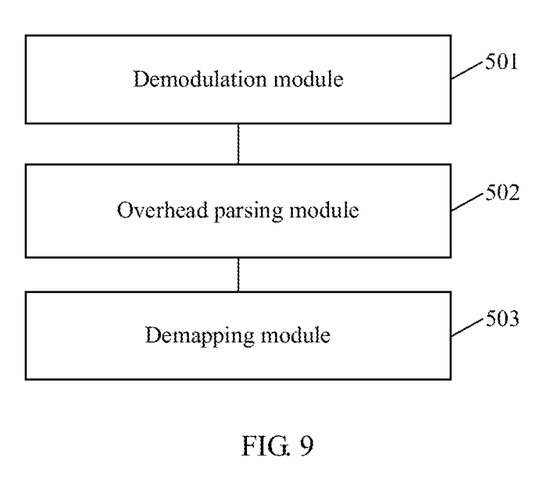
FIG. 9 is a schematic diagram of an apparatus for receiving a client signal according to an embodiment.

Referring to FIG. 9, an apparatus for receiving a client signal is provided in an embodiment, and includes: a demodulation module 501, an overhead parsing module 502, and a de=mapping module 503.

The demodulation module 501 is configured to receive one or more optical carriers in a same optical fiber, and demodulate transmission channels of a parallel transmission frame from the optical carrier.

The overhead parsing module 502 is configured to parse an overhead of the transmission channels of the parallel transmission frame that are demodulated by the demodulation module 501, to obtain channels of the parallel transmission frame, where the overhead includes a frame header identifier, a mapping overhead, and a management overhead that is extracted from one transmission channel in the transmission channels of the parallel transmission frame, where the management overhead is used to centrally manage the channels of the parallel transmission frame, and bit rates of the transmission channels of the parallel transmission frame are fixed.

The de=mapping module 503 is configured to de-map the client signal from the transmission channels of the parallel transmission frame according to the frame header identifier, the mapping overhead, and the management overhead that are parsed by the overhead parsing module 502.

Beneficial effects of this embodiment are: one or more optical carriers in a same optical fiber are received, and transmission channels of a parallel transmission frame are demodulated from the optical carrier; an overhead of the transmission channels of the parallel transmission frame is parsed, to obtain channels of the parallel transmission frame; the client signal is de-mapped from the channels of the parallel transmission frame according to a frame header identifier, a mapping overhead, and a management overhead. In this way, low-speed processing of multi-channelization is implemented when optically transmitted data with higher spectral efficiency is decoded, thereby reducing complexity and costs of processing by a receiving end, and preventing setting a large number of buffers on the receiving end to compensate a delay among multiple transmission channels, which saves plenty of costs.

The apparatus provided in this embodiment may specifically belong to a same idea as the method embodiment; for a specific implementation process thereof, reference may be made to the method embodiment, which is not described herein again.

It should be noted that, in the foregoing apparatus embodiments for transmitting and receiving a client signal, various modules included are divided merely according to a logical function, and the division is not limited to the foregoing division as long as a corresponding function can be implemented. In addition, specific names of the various functional modules are merely for ease of distinguishability from each other, but are not intended to limit the protection scope of the present invention.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for transmitting a client signal, the method comprising:
   mapping the client signal into channels of a parallel transmission frame, wherein the parallel transmission frame comprises at least two channels;
   after the mapping, adding an overhead for the channels of the parallel transmission frame to form transmission channels of the parallel transmission frame, wherein a management overhead is added to only one of the channels of the parallel transmission frame after the mapping, wherein the management overhead manages the channels of the parallel transmission frame;
   modulating the transmission channels of the parallel transmission frame onto one or more optical carriers in a same optical fiber; and
   transmitting the optical carrier after the modulation.

2. The method according to claim 1, wherein a rate of the parallel transmission frame depends on a number of transmission channels of the parallel transmission frame and bit rates of the transmission channels.

3. The method according to claim 2, wherein the bit rates of the transmission channels of the parallel transmission frame are equal and the number of transmission channels of the parallel transmission frame is adjusted to form a parallel transmission frame with a changeable rate.

4. The method according to claim 1, wherein mapping the client signal into channels of a parallel transmission frame comprises:
   when a rate of the client signal is greater than a rate of a single channel of the parallel transmission frame, splitting the client signal to obtain multiple client signals after the splitting, and mapping the multiple client signals that are obtained after the splitting into corresponding channels of the parallel transmission frame;
   when a rate of the client signal is less than a rate of a single channel of the parallel transmission frame, mapping the client signal into one channel of the parallel transmission frame; and
   when the client signal is a multichannel parallel client signal and a rate of a single channel of the multichannel parallel client signal is less than a rate of a single channel of the parallel transmission frame, mapping each channel of the multichannel parallel client signal into a corresponding channel of the parallel transmission frame.

5. The method according to claim 1, wherein the overhead added for the channels of the parallel transmission frame after the mapping comprises a frame header identifier and a mapping overhead, wherein the frame header identifier is used to identify a start of a channel of the parallel transmission frame and the mapping overhead is used to indicate a location, into which the client signal is mapped, in the channel.

6. The method according to claim 5, wherein the overhead added for the channels of the parallel transmission frame after the mapping further comprises one or more of a channel number identifier and a forward error correction (FEC) code, wherein the channel number identifier is used to distinguish each channel of the parallel transmission frame after the mapping, and the FEC code is used to provide the channels of the parallel transmission frame with a forward error correction function.

7. The method according to claim 1, wherein the management overhead comprises information about allocation of a corresponding channel of the parallel transmission frame to a corresponding client signal and/or information indicating a type of a client signal carried by a corresponding channel of the parallel transmission frame.

8. The method according to claim 7, wherein the management overhead further comprises a lane monitor overhead and/or an automatic protection switching overhead, wherein the lane monitor overhead is used to monitor the channels of the parallel transmission frame, and the automatic protection switching overhead is used to implement automatic switching of the channels of the parallel transmission frame in case of a fault, so as to recover transmission of the client signal.

9. A method for receiving a client signal, the method comprising:
   receiving one or more optical carriers in a same optical fiber;
   demodulating transmission channels of a parallel transmission frame from the optical carrier;
   parsing an overhead of the transmission channels of the parallel transmission frame, to obtain channels of the parallel transmission frame, wherein the overhead comprises a frame header identifier, a mapping overhead, and a management overhead that is extracted from one transmission channel in the transmission channels of the parallel transmission frame; and
   de-mapping the client signal from the channels of the parallel transmission frame according to the frame header identifier, the mapping overhead, and the management overhead.

10. An apparatus comprising:
    a processor; and
    a non-transitory computer-readable storage medium storing program to be executed by the processor, the program including instructions for:

mapping a client signal into channels of a parallel transmission frame, wherein the parallel transmission frame comprises at least two transmission channels;

adding an overhead for the channels of the parallel transmission frame after mapping, to form transmission channels of the parallel transmission frame, wherein a management overhead is added to only one of the channels of the parallel transmission frame after the mapping, wherein the management overhead manages the channels of the parallel transmission frame;

modulating the transmission channels of the parallel transmission frame that are formed by the adding onto one or more optical carriers in a same optical fiber; and transmitting the optical carrier after the modulation.

11. The apparatus according to claim 10, wherein a rate of the parallel transmission frame depends on a number of transmission channels of the parallel transmission frame and bit rates of the transmission channels.

12. The apparatus according to claim 10, wherein the programming includes further instructions for adjusting a number of transmission channels of the parallel transmission frame to form a parallel transmission frame with a changeable rate when bit rates of the transmission channels of the parallel transmission frame are equal.

13. The apparatus according to claim 10, wherein the program includes further instructions for:
when a rate of the client signal is greater than a rate of a single channel of the parallel transmission frame, splitting the client signal to obtain multiple client signals after the splitting, and mapping the multiple client signals that are obtained after the splitting into corresponding channels of the parallel transmission frame;
when a rate of the client signal is less than a rate of a single channel of the parallel transmission frame, mapping the client signal into one channel of the parallel transmission frame; and
when the client signal is a multichannel parallel client signal and a rate of a single channel of the multichannel parallel client signal is less than a rate of a single channel of the parallel transmission frame, mapping each channel of the multichannel parallel client signal into a corresponding channel of the parallel transmission frame.

14. The apparatus according to claim 10, wherein the overhead added for the channels of the parallel transmission frame after the mapping comprises a frame header identifier and a mapping overhead, wherein the frame header identifier is used to identify a start of a channel of the parallel transmission frame, and the mapping overhead is used to indicate a location, into which the client signal is mapped, in the channel.

15. The apparatus according to claim 14, wherein the overhead added for the channels of the parallel transmission frame after the mapping further comprises one or more of a channel number identifier and a forward error correction (FEC) code, wherein the channel number identifier is used to distinguish each channel of the parallel transmission frame after the mapping, and the FEC code is used to provide the channels of the parallel transmission frame with a forward error correction function.

16. The apparatus according to claim 10, wherein the management overhead comprises information about allocation of a corresponding channel of the parallel transmission frame to a corresponding client signal and/or information indicating a type of a client signal carried by a corresponding channel of the parallel transmission frame.

17. The apparatus according to claim 16, wherein the management overhead further comprises a lane monitor overhead and/or an automatic protection switching overhead, wherein the lane monitor overhead is used to monitor the channels of the parallel transmission frame, and the automatic protection switching overhead is used to implement automatic switching of the channels of the parallel transmission frame in case of a fault, so as to recover transmission of the client signal.

18. An apparatus comprising:
a processor; and
a non-transitory computer-readable storage medium storing program to be executed by the processor, the program including instructions for:
receiving one or more optical carriers in a same optical fiber;
demodulating transmission channels of a parallel transmission frame from the optical carrier;
parsing an overhead of the transmission channels of the parallel transmission frame that are demodulated by the demodulating, to obtain channels of the parallel transmission frame, wherein the overhead comprises a frame header identifier, a mapping overhead, and a management overhead that is extracted from one transmission channel in the transmission channels of the parallel transmission frame; and
de-mapping a client signal from the channels of the parallel transmission frame after the mapping according to the frame header identifier, the mapping overhead, and the management overhead that are parsed by the parsing.

* * * * *